(12) United States Patent
Kagoshima

(10) Patent No.: US 7,279,801 B2
(45) Date of Patent: Oct. 9, 2007

(54) HYBRID CONSTRUCTION MACHINE HAVING AUXILIARY BATTERY AND CONTROL APPARATUS THEREOF

(75) Inventor: Masayuki Kagoshima, Kobe (JP)

(73) Assignee: Kobelco Construction Machinery Co., Ltd., Hiroshima-shi (JP)

(*) Notice: Subject to any disclaimer, the term of this patent is extended or adjusted under 35 U.S.C. 154(b) by 561 days.

(21) Appl. No.: 10/893,262

(22) Filed: Jul. 19, 2004

(65) Prior Publication Data

US 2005/0001606 A1     Jan. 6, 2005

Related U.S. Application Data

(62) Division of application No. 10/018,859, filed on Dec. 26, 2001, now abandoned.

(51) Int. Cl.
*H02J 11/00*   (2006.01)

(52) U.S. Cl. .................. 290/40 C; 290/4 R; 290/4 C; 180/312; 180/65.2

(58) Field of Classification Search .............. 290/4 R, 290/4 C, 7, 40 A, 40 B, 40 C; 18/65.2, 65.4, 18/312

See application file for complete search history.

(56) References Cited

U.S. PATENT DOCUMENTS

| | | | |
|---|---|---|---|
| 2,729,750 A | 1/1956 | Draper et al. ................. 290/36 |
| 3,108,190 A | 10/1963 | Gebhard ....................... 290/36 |
| 3,340,402 A | 9/1967 | Curtis .......................... 307/48 |
| 3,917,017 A | 11/1975 | Deane | |
| 4,780,618 A | 10/1988 | Wareman et al. ............. 307/64 |
| 4,837,694 A * | 6/1989 | Narita et al. .................. 701/70 |
| 5,318,142 A | 6/1994 | Bates et al. | |
| 5,533,583 A | 7/1996 | Adler et al. | |
| 5,547,208 A | 8/1996 | Chappell et al. .............. 307/66 |
| 5,848,531 A * | 12/1998 | Nakamura et al. ........... 60/426 |
| 5,930,996 A * | 8/1999 | Nakamura et al. ........... 60/426 |
| 5,967,756 A * | 10/1999 | Devier et al. ................. 417/18 |
| 5,969,624 A | 10/1999 | Sakai et al. .................. 307/9.1 |

(Continued)

FOREIGN PATENT DOCUMENTS

EP   0 782 940 A1   7/1997

(Continued)

OTHER PUBLICATIONS

Patent Abstracts of Japan, JP 11-008945, Jan. 12, 1999.

*Primary Examiner*—Nicholas Ponomarenko
(74) *Attorney, Agent, or Firm*—Oblon, Spivak, McClelland, Maier & Neustadt, P.C.

(57) ABSTRACT

A hybrid construction machine according to the present invention is constructed to drive electric motors (6, 7, 13, 15, 23, 25) by means of power of a power generator (11) to be driven by an engine (10), power of an auxiliary battery (42) and power of a main battery (12) charged with power of the power generator (11). The hybrid construction machine has a switch (43) for switching to drive the electric motors (6, 7, 13, 15, 23, 25) by means of power of at least one of the power generator (11) and the main battery (12) when operating normally and to drive the electric motors (6, 7, 13, 15, 23, 25) by means of power of the auxiliary battery (42) when operating emergency such that the electric motors (6, 7, 13, 15, 23, 25) can not be driven by means of the normal power.

8 Claims, 12 Drawing Sheets

U.S. PATENT DOCUMENTS

| | | | |
|---|---|---|---|
| 6,109,858 A * | 8/2000 | Deneve et al. | 414/685 |
| 6,177,737 B1 | 1/2001 | Palfey et al. | 307/64 |
| 6,427,107 B1 | 7/2002 | Chiu et al. | 307/9.1 |
| 6,486,568 B1 | 11/2002 | King et al. | 307/66 |
| 6,742,619 B2 * | 6/2004 | Farbotnik et al. | 180/312 |
| 6,958,549 B2 * | 10/2005 | Wakitani et al. | 290/40 C |

FOREIGN PATENT DOCUMENTS

| | | |
|---|---|---|
| EP | 0 913 292 A2 | 5/1999 |
| JP | 59-28805 | 2/1984 |
| JP | 9-49248 | 2/1997 |
| JP | 9-217702 | 8/1997 |
| JP | 9-331604 | 12/1997 |
| JP | 10-108304 | 4/1998 |
| JP | 11-8945 | 1/1999 |

* cited by examiner

FIG.6
| CONTENT OF WORK | LOAD PROPERTY | LOAD VARIATION | LOAD LEVEL |
|---|---|---|---|
| EXCAVATING | 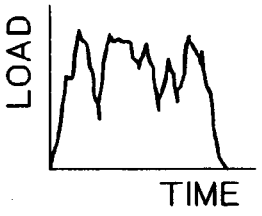 | VERY RAPID AND LARGE VARIATION | HIGH |
| MAKING EVEN | 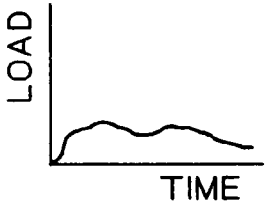 | RELATIVELY GENTLE | LOW |
| SLOPING A BANK | 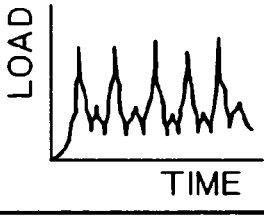 | VERY RAPID AND LARGE VARIATION | MIDDLE |
| HANGING | 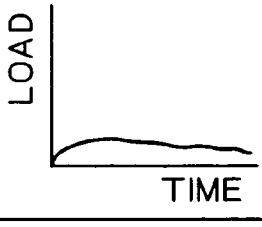 | GENTLE | LOW~MIDDLE (DIFFERENT ACCORDING TO HANGING LOAD) |
| SCATTERING | 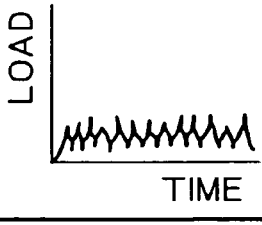 | VERY RAPID AND SMALL VARIATION | LOW |
| TRAVELING |  | GENTLE | HIGH |

FIG. 7

| WORK MODE | OUTPUT OF POWER GENERATOR |
|---|---|
| SCATTERING | 4 kW |
| SLOPING A BANK | 5 kW |
| SLOPE LEVELING | 9 kW |
| CRANE | 6 kW |
| PUSHING EXCAVATING | 20 kW |
| LOADING | 6 kW |
| FLATTERING ROTATING PLACE | 9 kW |
| SIMPLE EXCAVATING, GROOVE, HORIZONTAL EXCAVATING | 20 kW |

ERROR

HYBRID CONSTRUCTION MACHINE HAVING AUXILIARY BATTERY AND CONTROL APPARATUS THEREOF

TECHNICAL FIELD

The present invention relates to a hybrid construction machine such as a hybrid excavator for combining an engine and a battery to execute various works and a control apparatus thereof.

BACKGROUND OF THE INVENTION

In general, a construction machine such as an excavator is constructed such that a hydraulic pump is driven by means of an engine to drive an actuator with the hydraulic pressure, but with this construction, fuel efficiency thereof is poor and environmental problems such as noise, exhaust gas and the like occur, because works are executed while the engine output is largely varied correspondingly to large variation in load under work.

Therefore, in recent years, hybrid construction machines and control apparatuses thereof (Japanese Unexamined Utility Model Publication No. Hei 5-48501, Japanese Unexamined Patent Publication No. Hei 10-42587, etc.) have been developed and suggested, in which the engine is connected to an electric motor or a power generator to convert a part or whole of the engine output into electric power, power remaining in working with a light load is charged into a battery and the power is withdrawn from the battery to use in working with a heavy load. With this construction, for example, as shown in FIG. 12, because varying part of work load (work energy) could be smoothed by means of charge and discharge of the battery, variation of the engine output could be suppressed as small as possible even when the work load (work energy) is largely varied, to thereby realize improvement of the fuel efficiency and reduction of noise and exhaust gas However, in the above conventional construction, because the electric motor could not be driven when power could not be obtained from the power generator or the battery due to breakdown of the engine, the power generator, the battery and the like, operations after that time could not be executed. Therefore, for example, if the excavator is out of order when a boom is in a raised state, the boom stops in the raised position, the excavator must be left in this state until repair of the excavator is completed, and thus, safety could be threatened.

Also, the construction machine, specifically, the excavator is required to perform various works different in work load, such as excavating, making even, sloping a bank, scattering and the like. Therefore, unless a relationship among the kinds of works described above, the engine output and the charged state of the battery is considered, there occur problems such as waste of energy, deterioration of the battery, reduction of work efficiency and the like.

Therefore, a first object of the present invention is to provide a hybrid construction machine capable of assuring safety thereof by emergency driving electric motors when power cannot be obtained from a power generator or a battery due to breakdowns thereof.

A second object of the present invention is to provide a control apparatus of a hybrid construction machine capable of preventing deterioration of batteries due to excessive charge or discharge when executing various works different in load.

A third object of the present invention is to provide a control apparatus of a hybrid construction machine capable of suppressing reduction of work efficiency while preventing deterioration of batteries due to excessive discharge as small as possible.

SUMMARY OF THE INVENTION

The present invention provides a hybrid construction machine constructed to drive electric motors by means of power of a power generator to be driven by an engine, power of a main battery and power of an auxiliary battery to be charged with the power of the power generator, comprising a switch for switching to drive the electric motors by means of normal power of at least one of the power generator and the main battery in a normal operation state and to drive the electric motors by means of auxiliary power of the auxiliary battery in an emergent operation state that the electric motor can not be driven by means of the normal power.

According to the above construction, because when the electric motors are not supplied with the normal power due to breakdowns of the power generator or the main battery in the normal operation, the electric motors can be driven by means of the auxiliary power from the auxiliary battery by switching to the auxiliary battery using the switch, to thereby execute the emergent operation, the construction machine can be moved in a safe region or restored in a safe pose to ensure safety and then parts out of order thereof can be repaired Also, the hybrid construction machine according to the present invention comprises an actuator-selecting switch for selecting the electric motors to be driven by means of the auxiliary power in the emergent operation. As a result, because only the electric motor selected by the actuator-selecting switch is driven by means of the auxiliary power, an auxiliary battery having a capacity smaller than that of the main battery required to drive many electric motors at the same time can be employed. Therefore, because the auxiliary battery can be minimized, enlargement of the construction machine due to equipment of the auxiliary battery can be suppressed as small as possible. Also, because undesired operations due to mis-manipulation and the like can be prevented, safety of the construction machine can be improved.

Also, the hybrid construction machine according to the present invention is a hybrid excavator. As a result, because the hybrid excavator assumes various poses such as the ascent of a boom or an arm and the like, the present invention can be suitably employed in a state that the hybrid construction machine stops in such poses.

Also, the present invention provides a control apparatus of a hybrid construction machine for executing works by charging a battery with power of a power generator to be driven by an engine and then driving electric motors by means of power discharged from at least the battery, the control apparatus comprising a generator output control unit for varying power output from the power generator in accordance with content of work.

According to the above construction, because power output from the power generator can be varied in accordance with the content of work, large power can be output from the power generator in working with a large load and small power can be output from the power generator in working with a small load. Also, because work load is proportional to the power consumption of the electric motors, large power is discharged from the battery in working with a large load and small power is discharged from the battery in working with a small load. Therefore, power discharged from the battery is increased or decreased correspondingly to the load in working with a predetermined content of work, power output from the power generator is increased or decreased correspondingly to the load and thus, the amount of charge in the battery is increased or decreased, so that the battery should not be deteriorated due to excessive charge or excessive discharge thereof.

Also, the control apparatus according to the present invention comprises a manipulating lever to be manipulated by an operator, and a work determination unit for determining the content of work on the basis of manipulating signal from the manipulating lever and outputting the content of work to the generator output control unit. As a result, because the content of work can be determined and recognized on the basis of the manipulating signal of the manipulating lever, labor that the operator appoints the content of work can be omitted.

Also, the control apparatus according to the present invention comprises a work mode switch with which the content of work can be appointed by an operator, and a switch detection unit for detecting the content of work appointed with the work mode switch and outputting the content of work to the generator output control unit. As a result, because the content of work appointed with the work mode switch can be recognized with high reliability, excessive charge and discharge of the battery due to mis-recognition and the like can be surely prevented.

Also, the present invention provides a control apparatus of a hybrid construction machine for executing works by charging a battery with power of a power generator to be driven by an engine and driving electric motors by means of power of at least one of the power generator and the battery, comprising a work speed regulation unit for regulating work speed in accordance with content of work when the power of the power generator is a predetermined value or less, so that power consumption of the electric motors is in a range not to cause excessive discharge of the power generator.

According to the above construction, when power of the power generator to be driven by the engine is a predetermined value or less such as in a state that the engine stops or in an idling state, a predetermined time delay occurs until the engine is driven sufficiently to obtain sufficient power from the power generator. During the delayed time, each work in the content of work is executed using power discharged from the battery. Therefore, in working with a large work load, executing the work at normal work speed causes deterioration of the battery due to excessive discharge, but according to the above construction of the present invention, because the work speed regulating unit regulates the work speed in accordance with the content of work such that the excessive discharge of the battery can be prevented, the battery can not be deteriorated due to the excessive discharge.

Also, because the work speed is regulated in accordance with the content of work so that power consumption of the electric motors is in a range not to cause the excessive discharge, the work speed of the respective contents of work can be set up to a maximum value in a range not to cause the excessive discharge. Therefore, because in working with a small work load, the work can be executed at a speed substantially equal to the normal work speed, work efficiency greater than that in the conventional case that the work speed is kept constant regardless of the content of work can be improved, to thereby suppress reduction of the work efficiency due to regulation of the work speed as small as possible.

Also, the control apparatus according to the present invention comprises a manipulating lever to be manipulated by an operator, and a work determination unit for determining the content of work on the basis of manipulating signal from the manipulating lever and outputting the result to the work speed regulation unit. As a result, because the content of work can be determined and recognized on the basis of the manipulating signal from the manipulating lever, labor that an operator appoints the content of work can be obviated.

Also, the control apparatus according to the present invention comprises a work mode switch with which the content of work can be appointed by an operator, and a switch detection unit for detecting the content of work appointed with the work mode switch and outputting the result to the work speed regulation unit. As a result, because the content of work appointed with the work mode switch can be recognized with high reliability, excessive discharge of the main battery due to mis-recognition can be surely prevented.

Also, the hybrid construction machine including the control apparatus according to the present invention is a hybrid excavator. As a result, the present invention can be suitably applied to a hybrid excavator for executing various contents of work of which load is varied within a great range.

BRIEF DESCRIPTION OF THE DRAWINGS

FIG. 6 is an explanatory view showing load properties of the respective works;

FIG. 7 is an explanatory view showing a relationship between the working mode and the generator output;

PREFERRED EMBODIMENT OF THE INVENTION

First Embodiment

Now, a first embodiment of the present invention will be explained with reference to FIGS. 1 to 3. Also, although in the following description, a hybrid excavator employing a series type hybrid mode will be explained, the first embodiment of the present invention may be applied to a hybrid excavator employing a parallel type hybrid mode.

Figure 3:
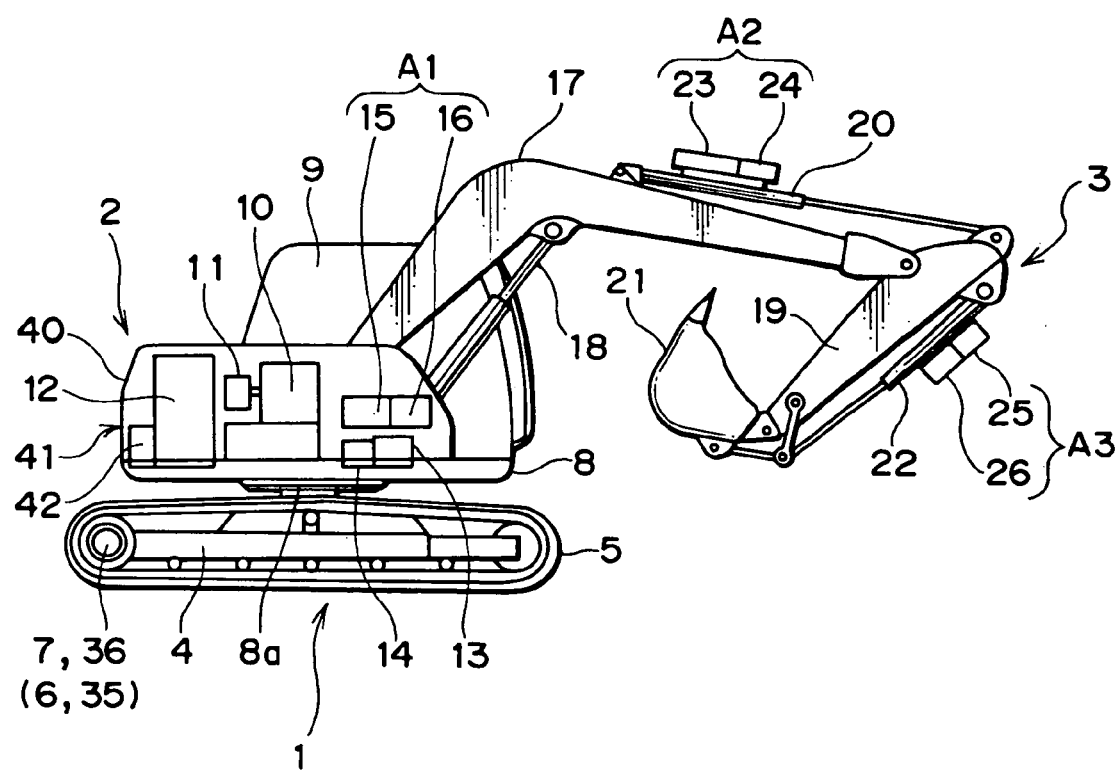
FIG. 3 is a side view schematically showing the whole hybrid excavator.

The hybrid excavator which is a hybrid construction machine according to the first embodiment, as shown in FIG. 3, includes a lower traveling body 1, an upper rotating body 2 rotationally provided at upper center of the lower traveling body 1, and an excavating attachment 3 provided at front part of the upper rotating body 2. The lower traveling body 1 has a pair of crawler frames 4 arranged at both ends thereof in parallel to each other, crawlers 5 rotationally provided around the respective crawler frames 4 and in surface contact with the ground, electric motors 6, 7 and reduction gears 35, 36 for rotationally driving the crawlers 5. The lower traveling body 1 constructed like this drives rotationally and separately the respective crawlers 5 in forward and backward directions through the reduction gears 35, 36 by means of the electric motors 6, 7 so that the whole excavator can advance, retreat, rotate and revolve.

At upper center of the lower traveling body 1, a rotating shaft 8a is provided perpendicular to the lower traveling body 1. In upper portion of the rotating shaft 8a, a rotating frame 8 constructing a part of the upper rotating body 2 is rotationally provided. On upper surface of the rotating frame 8, a cabin 9 to be an operating room for an operator and a machinery-receiving unit 41 covered with a protective cover 40 are provided and also, a boom 17 of the excavating attachment 3 and one end of a boom cylinder 18 are provided to be pivotable vertically.

Within the machinery-receiving unit 41, a rotating electric motor 13 and a reduction gear 14 are provided and also, an integral type boom actuator A1 including a boom electric motor 15 and a boom pump 16 as one body is provided. The rotating electric motor 13 drives the rotating frame 8 through the reduction gear 14 to revolve around the rotating shaft 8a. Also, the integral type boom actuator A1 is connected through hydraulic pipe not shown to the boom cylinder 18 and make a cylinder rod of the boom cylinder 18 advance and retreat with hydraulic pressure, to thereby make move up and down a front end (the other end) side of the boom 17

At the front end of the boom 17, an arm 19 is rotationally provided. At the front end of the arm 19, a bucket 21 is rotationally provided. Also, the boom 17 and the arm 19 are connected through an arm cylinder 20 to each other, and the arm 19 and the bucket 21 are connected through a bucket cylinder 22 to each other. At these cylinders 20, 22, an integral type arm actuator A2 and an integral type bucket actuator A3 are provided, respectively, and electric motors 23, 25 and pumps 24, 26 are incorporated as one body to construct the respective actuators A2, A3. The respective actuators A2, A3 make cylinder rods of the cylinders 20, 22 move forward and backward by the hydraulic pressure and thus, the arm 19 and the bucket 21 pivot up and down, respectively.

Also, in the above machinery-receiving body 41, an engine 10, a power generator 11 for generating AC power corresponding to rotational speed (output of engine) of the engine 10, a main battery 12 used in normal operation and an auxiliary battery 42 used in emergent operation in which the main battery 12 cannot be used are provided, in addition to the rotating electric motor 13 and the integral type boom actuator A1. Also, a secondary battery capable of repeatedly being charged with and discharging power such as a Pb storage battery or nickel hydrogen storage battery is employed in both of the batteries 12, 42.

Figure 1:
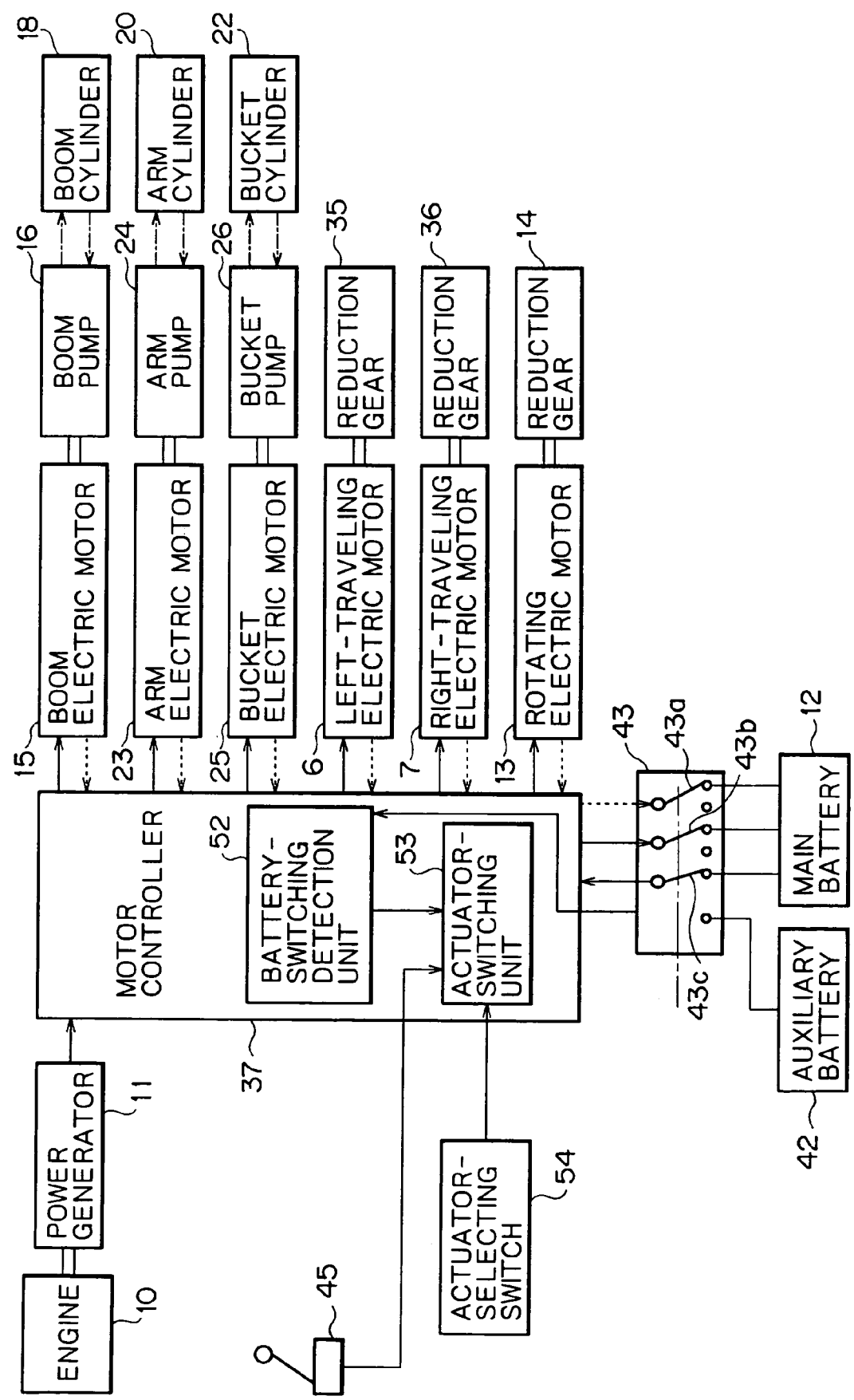
FIG. 1 is a block diagram showing a control apparatus of the hybrid excavator.
Figure 2:
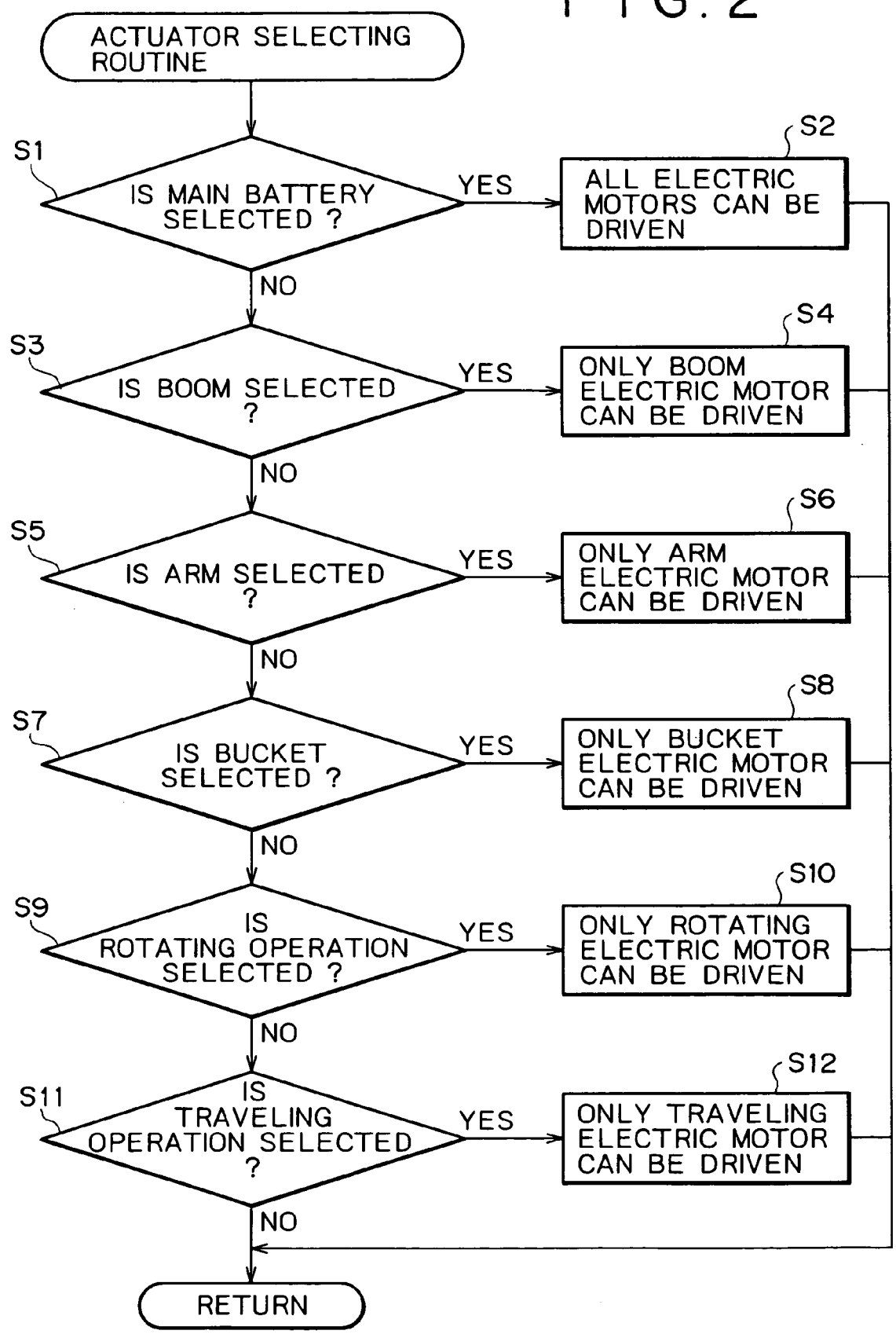
FIG. 2 is a flow chart showing a selection routine of an actuator.

As shown in FIG. 1, the power generator 11 is connected to a motor controller 37 of the control apparatus. The motor controller 37 is connected to the various electric motors 6, 7, 13, 15, 23, 25 described above and connected through a switch 43 to the main battery 12 and the auxiliary battery 42. The switch 43 comprises 3 switching parts 43a~43c for bi-directionally switching, wherein two switching parts 43a, 43b are used for charging and stopping the main battery 12 and one switching part 43c remained is used for switching between discharge from the main battery 12 and discharge from the auxiliary battery 42. The switch 43 is set up such that at the time of normal operation, the switching parts 43a~43c all connect the main battery 12 and the motor controller 37 to each other and such that at the time of emergent operation, the switching parts 43a, 43b are separated from the main battery 12 and the switching part 43c is switched to connect the auxiliary battery 42 and the motor controller 37 to each other. Also, switching manipulation of the switch 43 may be executed manually by an operator and may be executed automatically when defect such as a drop in electric power is detected.

The motor controller 37 described above has various control functions such as a function of a power converter (a function of an inverter) for converting AC power from the power generator 11 into DC power or converting DC power from the battery 12, 42 into AC power, a function of driving the electric motors for outputting AC power obtained by means of convertion from, for example, the main battery 12 to the respective electric motors 6, 7, 13, 15, 23, 25 on the basis of manipulating signal from a manipulating lever 45, a function of normal charge for charging the main battery 12 with power generated from the power generator 11 and a function of revival charge for charging the main battery 12 with revival power generated from the respective electric motors 6, 7, 13, 15, 23, 25, and also, has a function for detecting amount of charge in the main battery 12, amount of generation in the power generator and the like. Therefore, the control functions can be arbitrarily executed on the basis of amount of charge in the main battery 12, amount of generation in the power generator 11 and the like.

Also, the motor controller 37 has a battery-switching detection body 52 and an actuator-switching body 53. The switch 43 is connected to the battery-switching detection body 52 and thus, the battery-switching detection body 52 detects connecting states of the respective switching parts 43a~43c in the switch 43 and outputs it to the actuator-switching body 53 as switching detection signal. Also, the actuator-switching body 53 is connected with the manipulating lever 45 and the actuator-selecting switch 54, in addition to the battery-switching detection body 52. The manipulating lever 45 and the actuator-selecting switch 54 are provided in the cabin 9 shown in FIG. 3 and outputs the manipulating signal corresponding to amount of manipulation by the operator. Also, the actuator-selecting switch 54 is used in operator's appointing the electric motors that can be driven by means of power of the auxiliary battery 42.

As described above, the actuator-switching body 53 to which signal is input from the respective units 45, 52, 54 monitors the switching detection signal from the battery-switching detection body 52 while executing an actuator-selecting routine, makes all electric motors 6, 7, 13, 15, 23, 25 operate when connection to the main battery 12 is recognized, and makes only the specific electric motors selected by the actuator-selecting switch 54 operate when connection to the auxiliary battery 42 is recognized, on the basis of the signal.

In the above construction, operation of the hybrid excavator will be explained hereinafter.

When power is input to the motor controller 37 and the engine 10 is driven, by executing starting manipulation such that the operator in the cabin shown in FIG. 3 has the operating key turned, the motor controller 37 first recognizes amount of charge in the main battery 12. If the amount of charge is insufficient, AC power generated from the power generator to be driven by the engine 10 is converted into DC power to charge the main battery 12. Also, if the amount of charge is excessively insufficient, output (rotational speed) of the engine 10 is increased and thus, the amount of generation from the power generator 12 is increased, to promptly charge the main battery 12. On the other hand, if the amount of charge is sufficient, the output (rotational speed) of the engine 10 is in an idling state in which the output is minimum or the engine 10 is made to stop, to thereby prevent excessive charge of the main battery 12 and then, to stand by until manipulating signal is input from the manipulating lever 45.

Next, when the operator manipulates the manipulating lever 45 to execute a predetermined work, manipulating signal corresponding to amount of manipulation is output from the manipulating lever 45. The manipulating signal is input to the actuator-switching body 53 of the motor controller 37. At that time, the actuator-switching body 53 monitors connecting state (selecting state) of the switch 43 on the basis of switching detection signal from the battery-switching detection body 52 while executing an actuator-selecting routine of FIG. 2 (S1). When connection to the main battery 12 is recognized (S1, YES), the respective electric motors 6, 7, 13, 15, 23, 25 are driven by manipulation amount corresponding to the manipulating signal from the manipulating lever 45, so that the content of work is executed using the normal power from the main battery 12 or the power generator 11 (S2).

Next, when the normal power cannot be supplied to the electric motors 6, 7, 13, 15, 23, 25 due to breakdown of the engine 10, the power generator 11, the main battery 12 and the like under work, the boom 17 or the arm 19 of FIG. 3 stops in the course of working For example, when the boom stops in a pose pivoted upward, the boom 17 can suddenly go down by its own weight in repairing wrong parts and thus, workers may lay in very dangerous situation. Also, when the excavator stopped on a slope, workers handles with repairing apparatuses in a sloped state that balance of the excavator is not good and thus, the workers may have a heavy burden.

Accordingly, an operator switches connection of a switch 43 from the main battery to the auxiliary battery in stopping under work, so that auxiliary power of the auxiliary battery can be supplied to the respective electric motors 6, 7, 13, 15, 23, 25 via a motor controller 37. When connection of the switch 43 is switched, the battery-switching detection body 52 for detecting connection thereof outputs the switching detection signal to an actuator-switching body 53. If the actuator-switching body 53 recognizes connection to the auxiliary battery on the basis of the detection signal (S1, NO), selection signal is introduced from the actuator-selecting switch 54 and it is determined whether operation of a boom 17 is. selected or not on the basis of the selection signal of the actuator-selecting switch 54(S3). For example, in a case that the boom 17 stops in a pose pivoted upward, if an operator selects "boom selection" in the actuator-selecting switch 54, it is determined that the boom 17 is selected (S3, YES) and only the electric motor 15 for boom is driven by means of power from the auxiliary battery 42 (S4). Thus, the operator can manipulate a manipulating lever 45 to get the boom 17 down to a safe position, and even if the operator makes a mistake in manipulating, there is no case that undesired operation is caused ill the excavator.

Also, when the boom 17 is not selected (S3, NO), it is determined whether the arm 19 is selected or not (S5). If the arm 19 is selected (S5, YES), only the electric motor 23 for arm is driven (S6), and if the arm 19 is not selected (S5, NO), it is determined whether the bucket 21 is selected or not (S7). If the bucket 21 IS selected (S7, YES), only the electric motor for bucket 25 is driven (S8), and if the bucket 21 is not selected (S7, NO), it is determined whether rotating operation is selected or not (S9). If the rotating operation is selected (S9, YES), only the electric motor for rotating operation 13 is driven (S10) and if the rotating operation is not selected (S9, NO), it is determined whether traveling operation is selected or not (S11). If the traveling operation is selected (S11, YES), only the electric motor 6 for left-traveling and the electric motor 7 for right-traveling are driven (S12).

Only the electric motors 6, 7, 13, 15, 23, 25 selected like above are driven and thus, after the excavator is moved into a safe region or in a safe pose, detection or repair of parts out of order can be executed. If repairing is over, the switch 43 is switched to connection to the main battery 12, and thus, the electric motors 6, 7, 13, 15, 23, 25 all can be driven with normal power, to execute works normally.

As described above, the hybrid excavator is constructed to drive the electric motor 15 by means of power of the power generator 11 to be driven by the engine 10, power of the auxiliary battery 42 and power of the main battery 12 to be charged with power of the generator 11. The hybrid excavator comprises a switch 43 for switching to drive the electric motor 15 by means of normal power of at least one of the power generator 11 and the main battery 12 in normal operation and to drive the electric motor 15 by means of auxiliary power of the auxiliary battery 42.

According to the above construction, because when normal power is not supplied to the electric motor 15 due to breakdown of the power generator 11, the main battery 12 and the like in the normal operation, the auxiliary battery 42 is connected by the switch 43 so that the electric motor 15 and the like can be driven by means of auxiliary power from the auxiliary battery 42, the construction machine is moved in a safe region or restored in a safe pose and then, parts out of order can be repaired.

Also, the hybrid excavator has an actuator-selecting switch 54 for selecting the electric motor 15 to be driven by means of the auxiliary power in the emergent operation. Since only the electric motor 15 selected by the actuator-selecting switch 54 can be driven by means of the auxiliary power, an auxiliary battery having capacity smaller than that of the main battery to drive many electric motors 15 and the like at the same time can be employed. Therefore, because the auxiliary battery 42 can be minimized, enlargement of the excavator due to addition of the auxiliary battery can be suppressed as much as possible. Also, it is possible to improve safety by preventing undesired operation due to mistake of manipulation.

Further, although the construction of the present embodiment and constructions of a second embodiment and a third embodiment to be described later can be properly applied to a hybrid excavator for assuming various poses such as rising of the boom 17 or the arm 19, the present invention is not limited to that and can be employed in all hybrid construction machines such as a bulldozer or a crane.

Second Embodiment

Now, a second embodiment of the present invention will be explained with reference to FIGS. 3 to 8. Also, the same reference numeral is attached to the same element as that of the first embodiment and the explanation thereof will be omitted.

Figure 4:
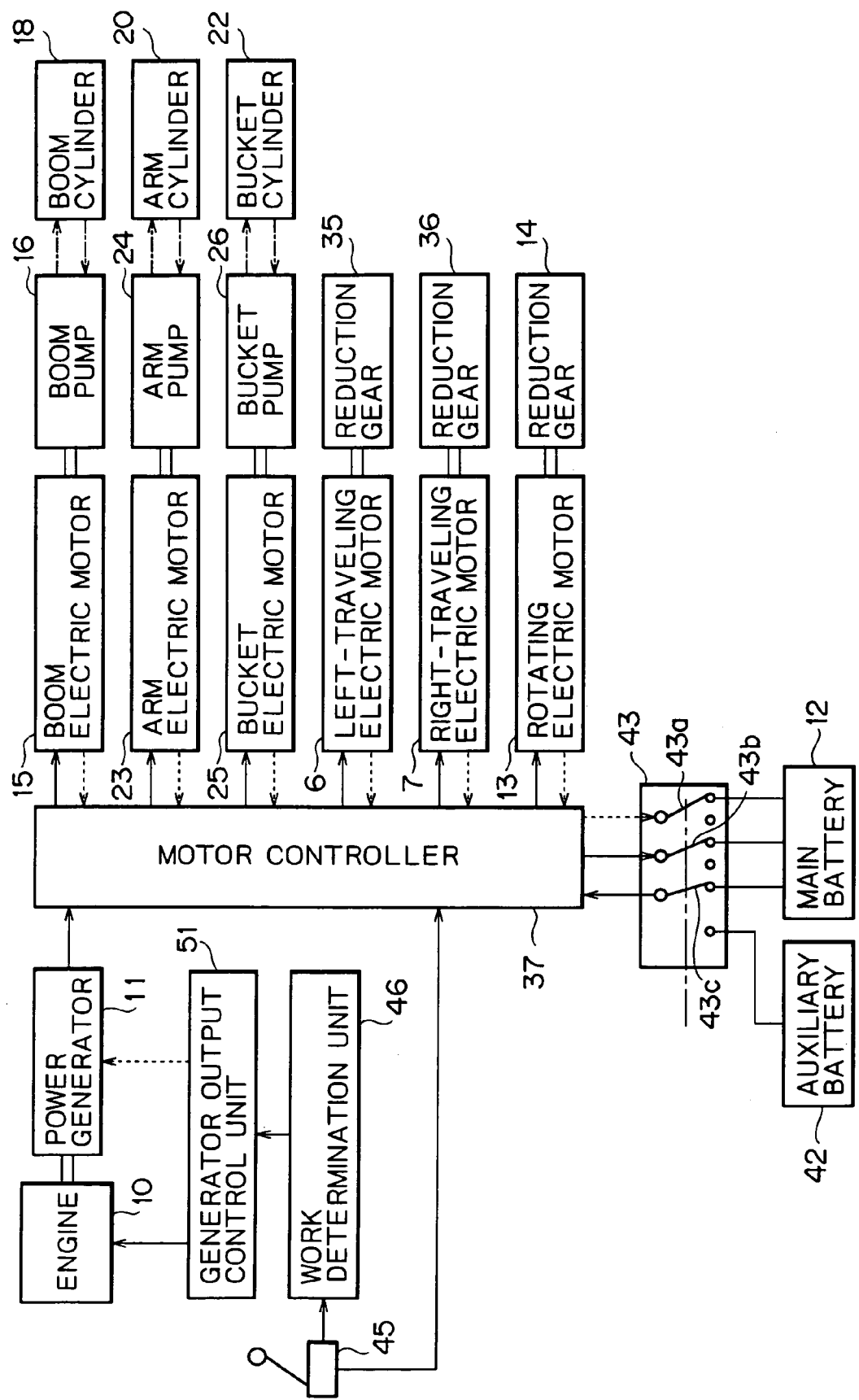
FIG. 4 is a block diagram showing a control apparatus of the hybrid excavator.

The hybrid excavator that is a hybrid construction machine according to the present invention comprises the motor controller 37, as shown in FIG. 4. The motor controller 37 is connected to a manipulating lever 45 provided in the cabin 9 of FIG. 3. The manipulating lever 45 is connected to a work determination body 46 together with the motor controller 37 and the work determination body 46 determines work 1 mode on the basis of a manipulating signal from the manipulating lever 45.

Figure 5:
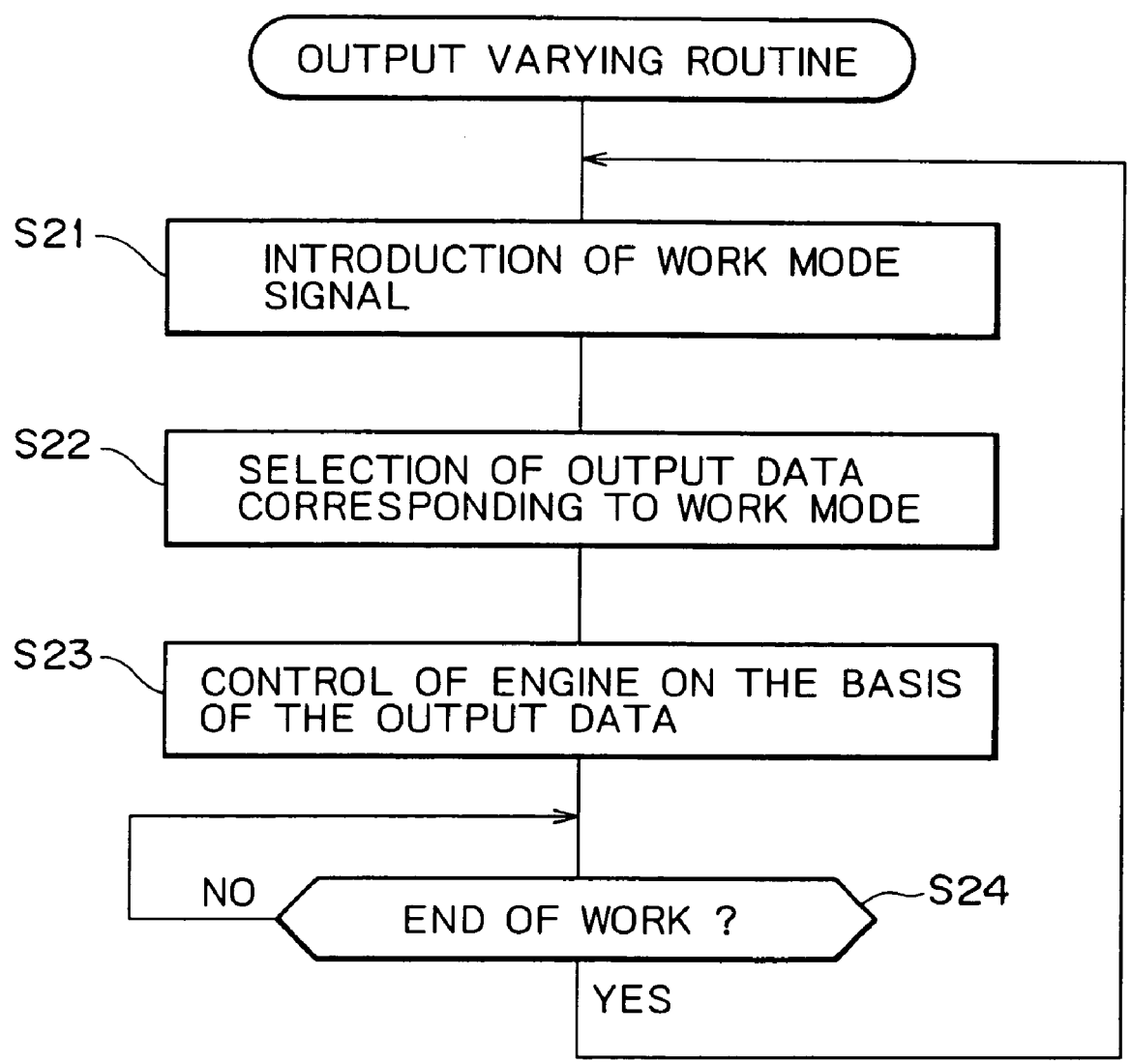
FIG. 5 is a flow chart showing an output variation routine.

The work determination body 46 is connected to a generator output control body 51 constructing a part of the control apparatus and by executing an output varying routine of FIG. 5, the generator output control body 51 controls rotational speed of the engine 10 by means of governor control and the like such that output of the power generator 11 corresponds to work mode. Also, the generator output control body 51 may control the power generator 11, instead of the engine 10, by means of field magnet current control and the like. The power generator 11 for outputting power corresponding to work mode is connected to the motor controller 37 in the work determination body 46. The construction except for the above construction is equal to that of the first embodiment.

In the above construction, operation of the hybrid excavator will be explained hereinafter.

When power is input to the motor controller 37 and the engine 10 is driven, by executing starting manipulation such that the operator in the cabin of FIG. 3 has the operating key turned, the motor controller 37 first recognizes amount of charge in the main battery 12. If the amount of charge is insufficient, AC power generated from the power generator 11 to be driven by the engine 10 is converted into DC power to charge the main battery 12. Also, if the amount of charge is excessively insufficient, output (rotational speed) of the engine 10 is increased and thus, the amount of generation from the power generator 12 is increased, to promptly charge the main battery 12. On the other hand, if the amount of charge into the main battery 12 is sufficient, the output (rotational speed) of the engine 10 is in an idling state in which the output is minimum or the engine 10 is made to stop, to thereby prevent the excessive charge of the main battery 12 and then, to stand by until manipulating signal is input from the manipulating lever 45.

Next, when the operator manipulates the manipulating lever 45 to execute a predetermined work, the manipulating signal corresponding to amount of manipulation is output from the manipulating lever 45. The manipulating signal is input to the motor controller 37 and the work determination body 46, respectively. In the motor controller 37, its operation is started by using power discharged from the main battery 12 to drive the electric motor 6, 7, 13, 15, 23, 25, respectively with the manipulating mount corresponding to the manipulating signal. The work determination body 46 extracts feature of the manipulating signal and determines the work mode. As a method for determining work mode, for example, the method disclosed in Japanese Unexamined Patent Publication No. Hei 9-217702 can be used.

The work mode recognized by the work determination body 46 like above is output to the generator output control body 51. At that time, the generator output control body 47, while executing an output varying routine as shown in FIG. 5, receives a work mode signal from the work determination body 46 in order to recognize the work mode (content of work) included in the work mode signal (S21). As shown in FIG. 7, if the work mode is recognized, an output data of the power generator 11 corresponding to the recognized work mode is selected from the relation between the work mode stored in a memory and the output of the power generator 11. For example, when "scattering" is recognized as work mode, the output data of 4 kW set up correspondingly to the work mode is selected, and when "pushing excavation" is recognized as work mode, the output data of 20 kW set up correspondingly to the work mode is selected.

Then, rotational speed of the engine 10 corresponding to the selected output data is calculated, and the engine 10 is controlled to be at the rotational speed (S23). For example, when "scattering" is carried out as work mode, power 4 kW generated from the power generator 11 is small relatively, but since the work mode of "scattering" has light load and amount of generation of the main battery 12 is very small, it can be charged effectively without excessive charge. Also, when "pushing excavation" is carried out as work mode, power 20 kW generated from the power generator 11 is large relatively, but since the work mode of "pushing excavation" has heavy load and amount of discharge from the main battery 12 is very large, it can be charged effectively without excessive discharge.

Then, by monitoring work mode signal, manipulating signal and the like, it is determined whether work is over or not (S24). If work is not over (S24, NO), the engine 10 is controlled to maintain output of the power generator 11 selected correspondingly to the work mode described above. If work is over (S24, YES), operations are executed again from the step S21 so that control corresponding to next work mode can be carried out.

As described above, the hybrid excavator is constructed to charge the main battery 12 with power of the power generator 11 to be driven by the engine 10 as shown in FIG. 4 and comprises a control apparatus which can execute works by driving the electric motor 6 and the like with power discharged at least from the main battery 12. The control apparatus is constructed to have the generator output control body 51 for varying power output from the power generator 11 correspondingly to work load in the work mode (content of work).

According to the construction described above, if power output from the power generator 11 is varied correspondingly to work load of the work mode, large power is output from the power generator 11 when the work load is large, and small power is output from the power generator 11 when the work load is small. Also, since the work load is proportional to power consumption of the electric motor 6 and the like, large power is output from the maim battery 12 when the work load is large, and small power is output from the maim battery 12 when the work load is small. Thus, when work is progressed in predetermined work mode and power output from the main battery 12 is increased and decreased correspondingly to the work load, power output from the power generator 11 is increased and decreased correspondingly to the work load, and thus, amount of charge of the main battery 11 is increased and decreased. Therefore, it is sure that the main battery 12 cannot be deteriorated due to excessive charge or discharge.

Also, the above control apparatus is constructed to have a manipulating lever 45 to be manipulated by an operator and a work determination body 46 for determining work mode (content of work) and outputting the work mode to the generator output control body 51 on the basis of a manipulation signal from the manipulation lever 45. According to this construction, since work mode can be determined and recognized on the basis of the manipulating signal of the manipulating lever 45, labor that an operator appoints work mode can be reduced.

Figure 8:
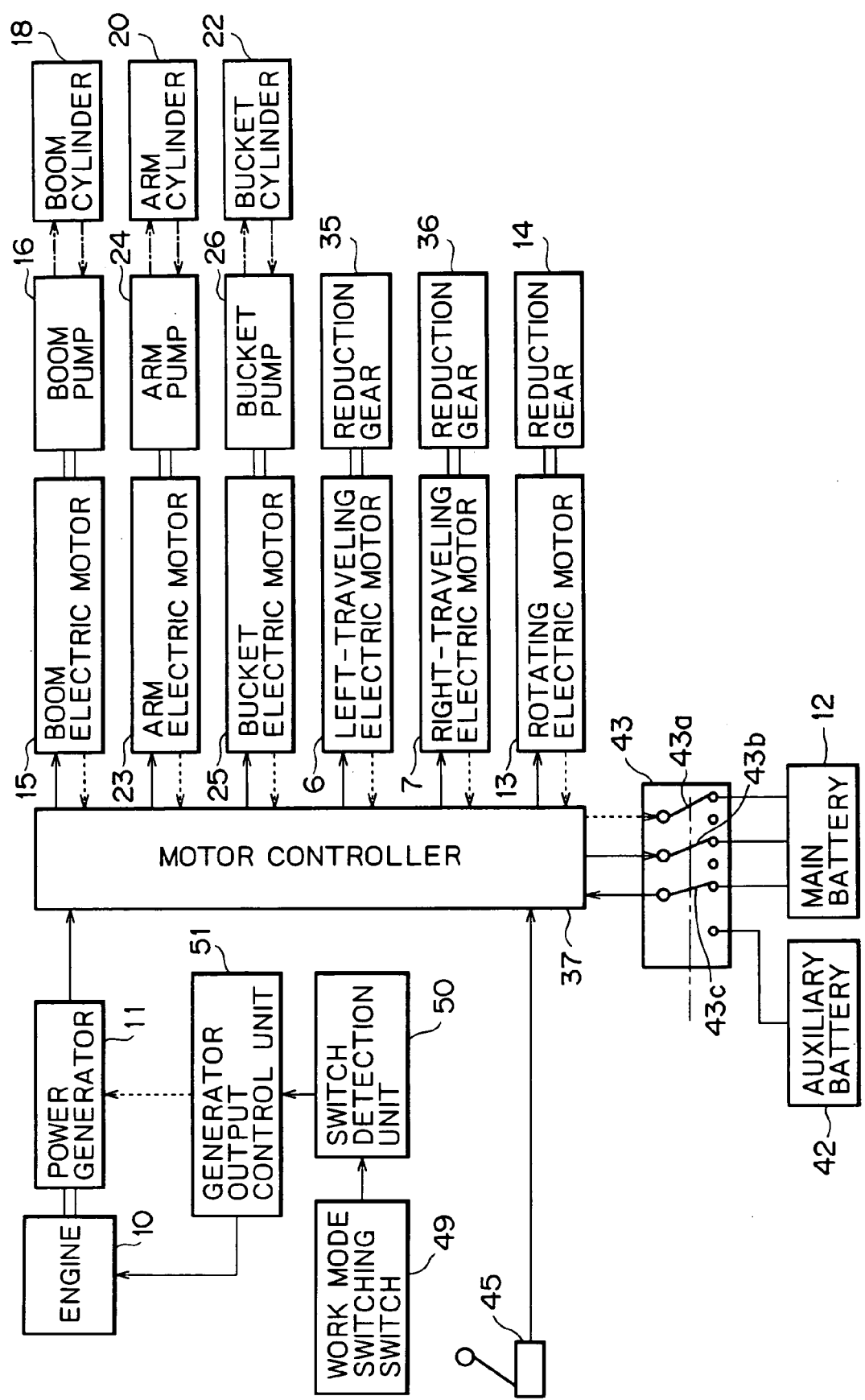
FIG. 8 is a block diagram showing a driving control system of the hybrid excavator.

Also, although in the control apparatus according to the present embodiment, the work determination body 46 recognizes the work mode on the basis of manipulating signal of the manipulation lever 45, the present invention is not limited to this example. In other words, as shown in FIG. 8, the control apparatus may be constructed to have a work mode switch 49 with which work mode can be appointed by an operator and a switch detection body 50 for detecting the work mode (content of work) appointed with the work mode switch 49 and outputting the work mode to the generator output control body 51. Also, according to this construction, since work mode appointed with the work mode switch 49 can be recognized with high reliability, it is possible to prevent excessive charge or discharge of the main battery 12 due to mis-recognition(wrong recognition).

(Third Embodiment)

Now, a third embodiment of the present invention will be explained with reference to FIG. 3, FIG. 6 and FIGS. 9 to 11. Also, the same reference numeral is attached to the same element as that of the first embodiment and the explanation thereof will be omitted.

Figure 9:
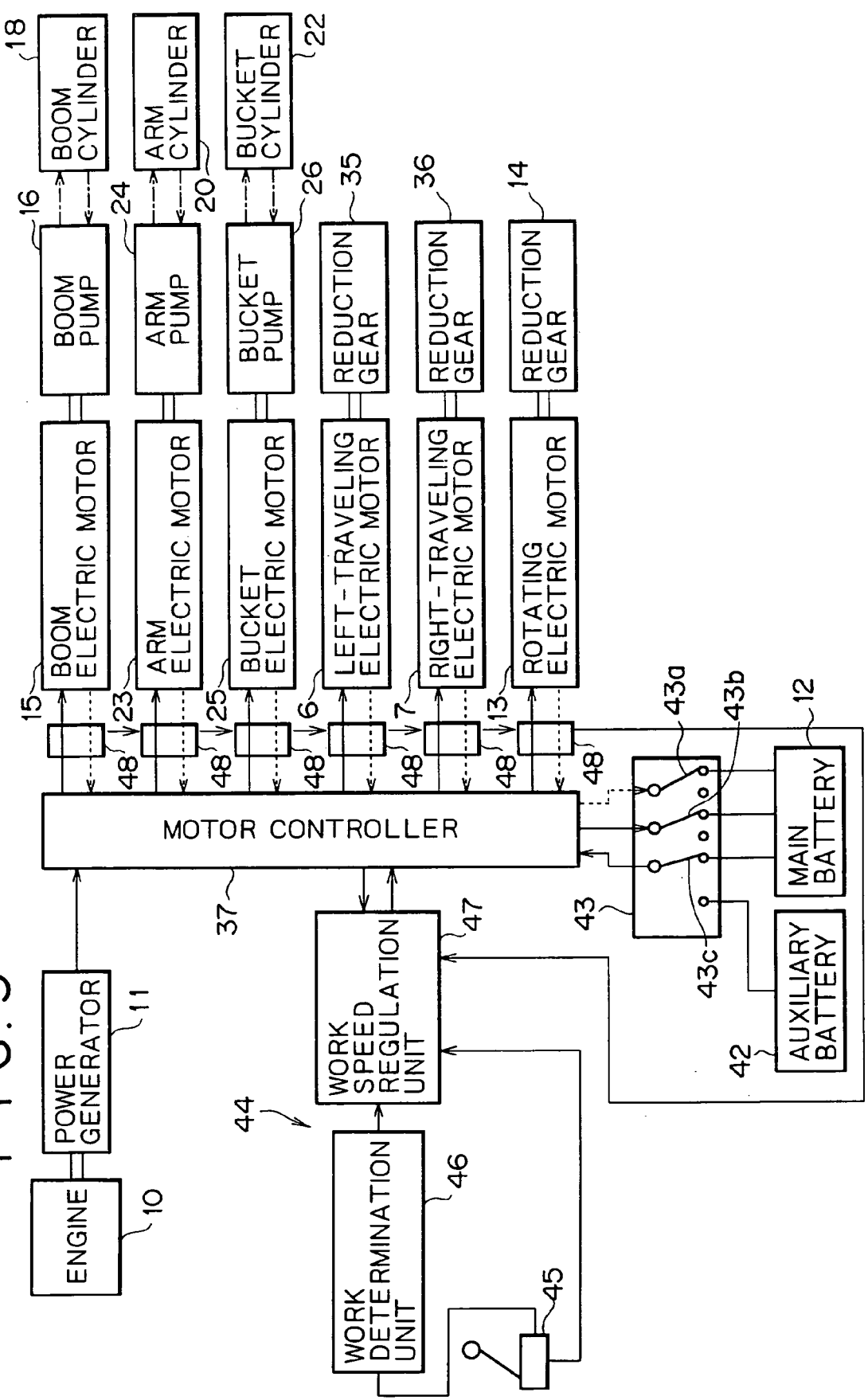
FIG. 9 is a block diagram showing a control apparatus of the hybrid excavator.

The hybrid excavator that is a hybrid construction machine according to the present embodiment comprises the motor controller 37, as shown in FIG. 9. The motor controller 37 is connected with a manipulating signal system 44 constructing a part of the control apparatus. The manipulating signal system 44 has a manipulating lever 45 provided in the cabin 9 of FIG. 3, a work determination body 46 for determining work mode (content of work) on the basis of a manipulating signal from the manipulating lever 45 and a work speed regulation body 47.

The work speed regulation body 47 is connected to the manipulating lever 45 and the work determination body 46 and connected to a power detection body 48 for detecting power consumption of the electric motors 6, 7, 13, 15, 23, 25. The work speed regulation body 47 executes a manipulating signal-correcting routine of FIG. 10, and outputs the manipulating signal correspondingly to the work mode under a predetermined condition to prevent the excessive discharge of the main battery 12 while regulating it, on the basis of the manipulating signal, the work mode signal, the power consumption signal and the like input from the respective bodies 45, 46, 48. Also, the work speed regulation body 47 receives the generation-amount detecting signal of the power generator 11 from the motor controller 37. The construction except for the above construction is equal to that of the first embodiment.

In the above construction, operation of the hybrid excavator will be explained hereinafter.

When power is input to the motor controller 37 and the engine 10 is driven, by executing starting manipulation such that the operator in the cabin of FIG. 3 has the operating key turned, the motor controller 37 first recognizes amount of charge in the main battery 12 If the amount of charge is insufficient, AC power generated from the power generator to be driven by the engine 10 is converted into DC power to charge the main battery 12. Also, if the amount of charge is excessively insufficient, output (rotational speed) of the engine 10 is increased and thus, the amount of generation from the power generator 12 is increased, to promptly charge the main battery 12 On the other hand, if the amount of charge is sufficient, the output (rotational speed) of the engine 10 is in an idling state in which the output is minimum or the engine 10 is made to stop, and wait until manipulating signal is input from the manipulating signal system 44 while preventing the excessive charge of the main battery 12.

Next, when the operator manipulates the manipulating lever 45 to execute a predetermined work, the manipulating signal corresponding to amount of manipulation is output from the manipulating lever 45. The manipulating signal is input to the work determination body 46 and the work speed regulation body 47, respectively. The work determination body 46 extracts feature of the manipulating signal and determines the work mode. As a method for determining the work mode, for example, the method disclosed in Japanese Unexamined Patent Publication No. Hei 9-217702 can be used.

Figure 10:
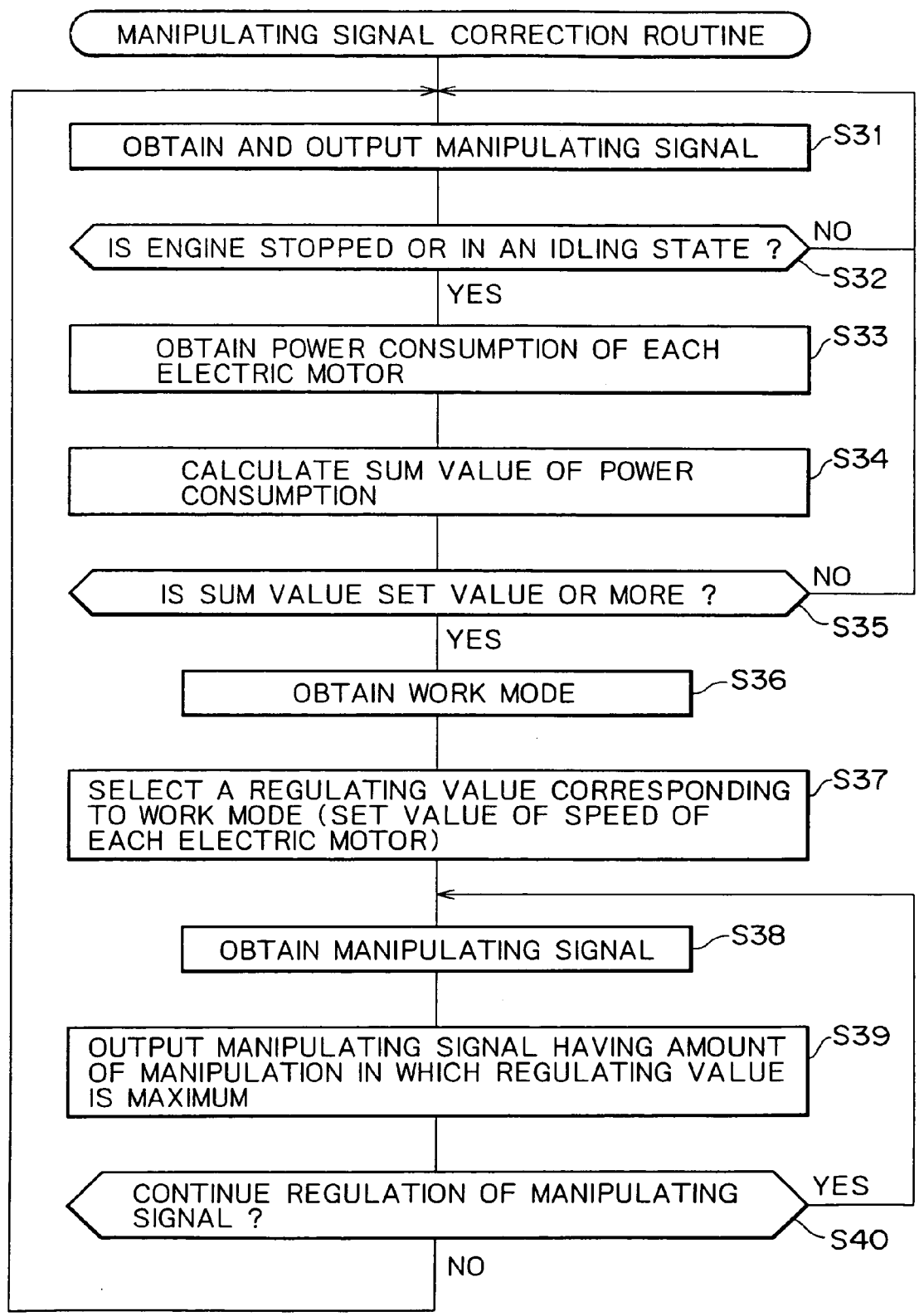
FIG. 10 is a flow chart showing a correcting routine of manipulating signal.

The work mode recognized by the work determination body 46 like above is output to the work speed regulation body 47. At that time, the work speed regulation body 47, while executing a manipulating signal-correcting routine as shown in FIG. 10, outputs the manipulating signal, as it is, to the motor controller 37 when the manipulating signal is input from the manipulating lever 45 By making the motor controller 37 in a standing by state operate the electric motors 6, 7, 13, 15, 23, 25 corresponding to the manipulating signal with the amount of manipulation of the manipulating signal, various works such as traveling of the excavator, excavating, sloping a bank and the like are executed (S31).

Thereafter, whether the engine 10 is in a stopping state or in an idling state is determined on the basis of, for example, generation amount of the power generator 11 (S32). When the engine 10 drives the power generator 11 at sufficient rotational speed (S32, NO), the works in all work mode can be executed without the work speed restricted, using large power from the power generator 11 and power from the main battery 12, and thus, S31 is re-executed to output the manipulating signal as it is to the motor controller 37 and to continue to work. On the other hand, when the engine 10 is in a stopping state or in a idling state (S32, YES), the power from the main battery 12 is mainly used until the engine 10 reaches a predetermined rotational speed Accordingly, to prevent deterioration of the main battery 12 due to excessive discharge, operations following step S33 are executed.

That is, the power consumption of the electric motors 6, 7, 13, 15, 23, 25 is obtained through the power detection body 48 (S33) and sum of the power consumption is output(S34). A setting value previously set up to prevent the excessive discharge of the main battery 12 is compared with the sum value and whether the sum value is the setting value or more is determined (S35). If the sum value is less than the setting value (S35, NO), it is determined that damage due to the excessive discharge of the main battery 12 does not occur even when works are continued by making the respective electric motors 6, 7, 13, 15, 23, 25 operate with the present manipulating signal. Accordingly, operations are re-executed from step S31 and works are continued at a work speed corresponding to the manipulating signal from the manipulating lever 45.

On the other hand, if the sum value of power consumption is the setting value or more (S35, YES), a work mode (content of work) input from the above work determination body 46 is introduced (S36) and regulating value corresponding to the work mode is selected. Also, because load variation or load level is different according to the work mode (content of work) as shown in FIG. 6, the regulating value corresponding to the work mode is set up correspondingly to the respective work modes on the basis of reference amount of discharge not to deteriorate the main battery 12 For example, in a case of work mode that the load variation or load level is great such as traveling or excavating, the regulating value is set up such that the rotational speed (work speed) of the electric motors 6, 7, 13, 15, 23, 25 is decreased more largely than that in the normal operation However, in a case of work mode that the load variation or load level is small such as hanging and the like, the regulating value is set up such that the rotational speed (work speed) of the electric motors 6, 7, 13, 15, 23, 25 is decreased a little smaller than that in the normal operation (S37).

If the regulating value corresponding to the work mode, as shown in FIG. 9, the manipulating signal from the manipulating lever 45 is introduced (S38), the amount of regulation is corrected such that the regulating value is an upper limit, and then the manipulating signal is output to the motor controller 37 (S39). Accordingly, because work is executed at work speed (consumed power) of the regulating value even in manipulating the manipulating lever 45 to be at maximum speed, deterioration of the main battery 12 due to the excessive discharge does not occur. Also, because the regulating values of the respective work modes are set up on the basis of the reference amount of discharge, works can be executed at work speed substantially equal to the normal work speed in case of work mode that load thereof is small. Therefore, reduction of work efficiency in the whole work can be suppressed as small as possible.

Next, whether restriction of the manipulating signal is continued or not is determined on the basis of the rotational speed of engine 10, amount of generation in the power generator 11 and the like (S40). When the engine 10 is driven at a sufficient rotational speed and works are executed without excessive discharge of the main battery 12 even if the work speed is not regulated with amount of generation in the power generator 11 and amount of discharge in the main battery 12, it is determined that regulation of the manipulating signal is completed (S40, NO). Then, S31 is re-executed and the manipulating signal is output to the motor controller 37, as it is, to execute the work at the normal work speed. On the other hand, when the rotational speed of the engine 10 or power from the main battery 12 is insufficient, it is determined that regulation of the manipulating signal is continued (S40, YES), and operations are re-executed from step S38 in order to prevent deterioration of the main battery 12 due to the excessive discharge. By outputting to the motor controller 37 while regulating and amount of manipulation, the work is continued at the regulated work speed.

As described above, the hybrid excavator comprises a control apparatus in which the main battery 12 can be charged with power of the power generator 11 to be driven by an engine 10 and the electric motor 6 operates by means of power of at least one of the power generator 11 and the main battery 12. The control apparatus has the work speed regulation body 47 for regulating the work speed correspondingly to the work mode (content of work) such that power consumption of the electric motor 6 should not cause discharge from the main battery 12 when power of the power generator 11 is a predetermined value or less that causes discharge from the main battery 12.

According to the above construction, when the power of the power generator 11 to be driven by the engine 10 is the predetermined as in a state that the engine 10 stops or in an idling state, a predetermined time delay occurs until the engine 10 is sufficiently driven to obtain sufficient power from the power generator 11. During the delayed time, works are executed using the power discharged from the main battery 12. Therefore, in working with a large work load, executing the work at the normal work speed causes deterioration of the main battery 12 due to the excessive discharge, but according to the above construction of the present invention, because the work speed regulation body 47 regulates the work speed in accordance with the content of work so that the excessive discharge of the main battery 12 can be prevented, the main battery 12 can not be deteriorated due to the excessive discharge.

Also, because the work speed is regulated correspondingly to the content of work such that power consumption of the electric motor 6 is in a range not to cause the excessive discharge, the work speed of the respective contents of work can be set up to be a maximum value in a range not to cause the excessive discharge. Therefore, because in working with a small work load, the work can be executed at a speed substantially equal to the normal work speed, work efficiency greater than that in the conventional case that the work speed is regulated constant regardless of the content of work can be obtained, to thereby suppress decrease of the work efficiency due to regulation of the work speed as small as possible.

Also, the control apparatus according to the present invention comprises a manipulating lever 45 to be manipulated by an operator, and a work determination body 46 for determining the work mode (content of work) on the basis of manipulating signal from the manipulating lever 45. According to this construction, because the work mode can be determined and recognized on the basis of the manipulating signal from the manipulating lever 45, labor that an operator appoints the content of work can be obviated.

Figure 11:
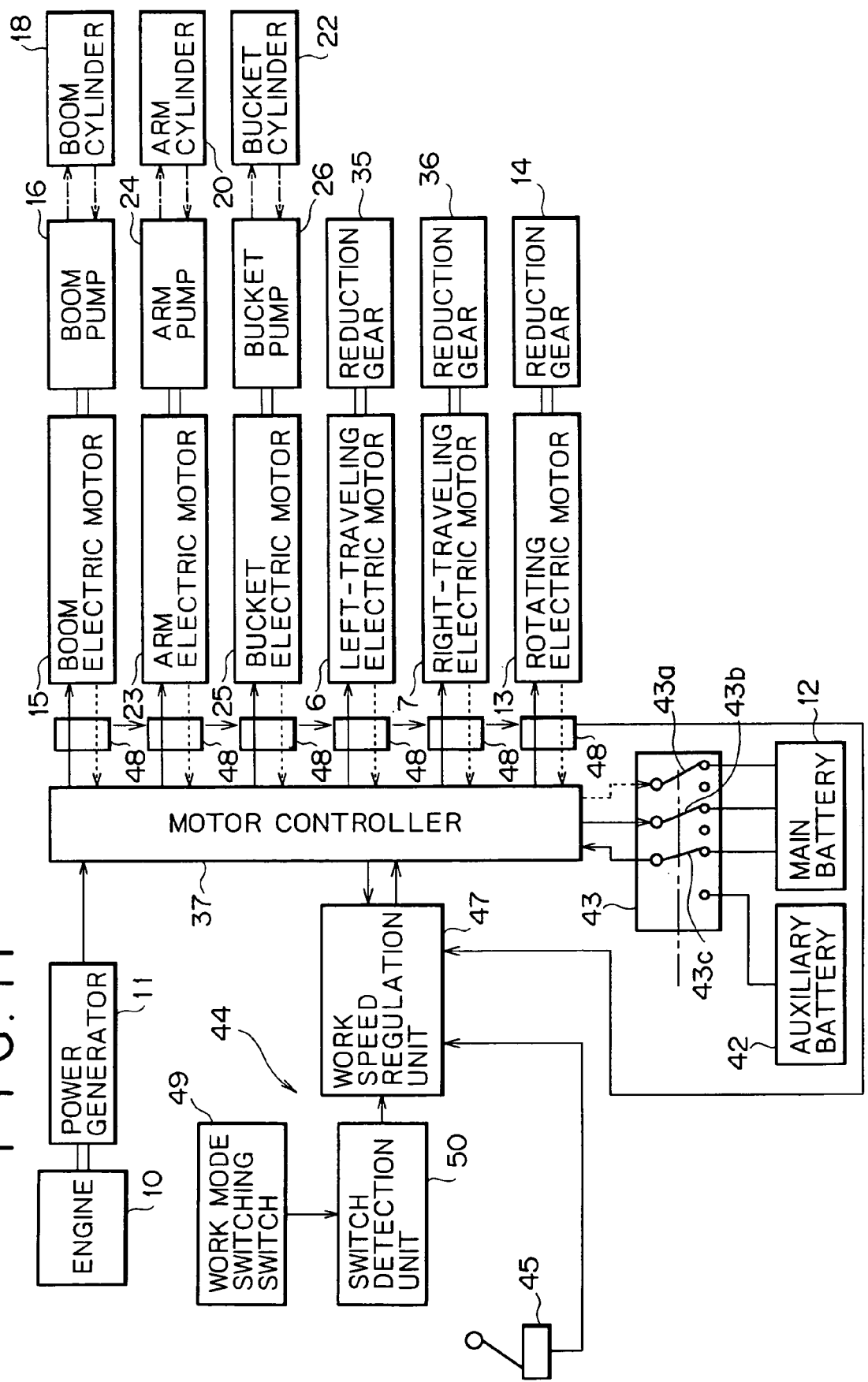
FIG. 11 is a block diagram showing a driving control system of the hybrid excavator.
Figure 12:
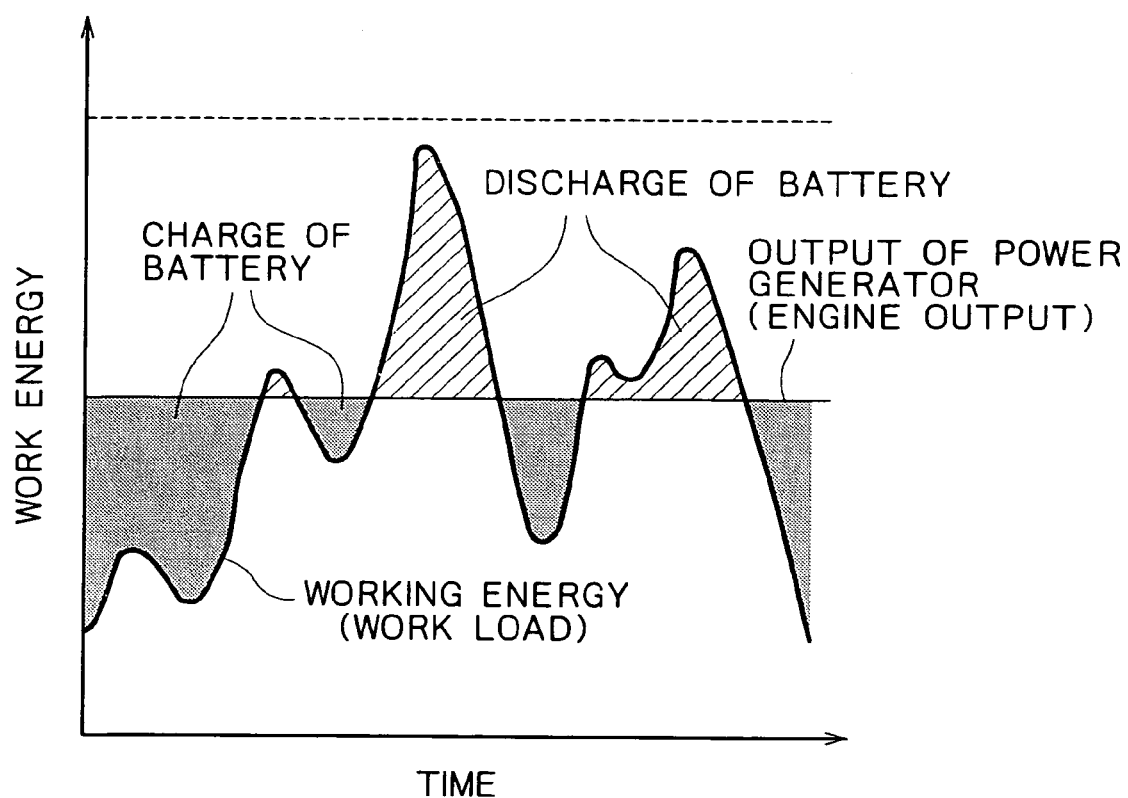
FIG. 12 is an explanatory view showing charging and discharging states of a battery in working in a hybrid mode.

Although, in the control apparatus of the present embodiment, the work mode is recognized on the manipulating signal from the manipulating lever 45 in the work determination body 46, the present invention is not limited to this construction. That is, the control apparatus, as shown in FIG. 11, may have a work mode switch 49 by which an operator can appoint the content of work with, and a switch detection body 50 for detecting the work mode appointed with the work mode switch 49 and outputting the result to the work speed regulation body 47. In this case, because the work mode can be recognized with high reliability, the excessive discharge of the main battery 12 due to mis-recognition can be surely prevented.

Also, in the control apparatus of the present embodiment, S33, S34 and S35 in the flow chart of FIG. 10 can be omitted. That is, when power from the power generator 11 is a predetermined value or less, a function for regulating speed correspondingly to the content of work in S36-S40 may be performed. In this construction, when the power from the power generator 11 is a predetermined value or less, the power consumption can be suppressed by means of regulation of speed corresponding to the content of work, and thus the excessive discharge of the battery can be prevented by properly regulating the work speed. Also, according to this construction, the power detection body 48 is not necessary and thus, the control system can be simplified

INDUSTRIAL AVAILABILITY

The control apparatus according to the present Invention is suitably used in a hybrid construction machine required to assure the safety by driving emergency the electric motors when power cannot be obtained from the power generator or the battery due to breakdown and the like. Also, the control apparatus according to the present invention is suitably used in a hybrid construction machine required, when executing various works different in load, to prevent deterioration of the battery due to the excessive charge or discharge, or to suppress reduction of work efficiency as small as possible while preventing deterioration of the battery due to the excessive discharge.

What is claimed is:

1. A control apparatus of a hybrid construction machine for executing works by charging a main battery with power of a power generator to be driven by an engine and driving electric motors by means of power discharged from at least the main battery, comprising:

a generator output control body for varying power output from the power generator in accordance with content of work performed by the hybrid construction machine.

2. The control apparatus of a hybrid construction machine according to claim 1, further comprising:

a manipulating lever to be manipulated by an operator; and a work determination body for determining the content of the work on the basis of a manipulating signal from the manipulating lever and outputting the content of the work to the generator output control body.

3. The control apparatus of a hybrid construction machine according to claim 1, further comprising:

a work mode switch with which the content of work can be selected by an operator; and a switch detection body for detecting the content of the work selected with the work mode switch and outputting the content of the work to the generator output control body.

4. A control apparatus of a hybrid construction machine for executing work by charging a main battery with power of a power generator to be driven by an engine and driving electric motors by means of power of at least one of the power generator and the main battery, comprising:

a work speed regulation body for regulating work speed in accordance with content of the work when power of the power generator is a predetermined value or less.

5. The control apparatus of a hybrid construction machine according to claim 4, further comprising a manipulating lever to be manipulated by an operator; and a work determination body for determining the content of work on the basis of manipulating signal from the manipulating lever and outputting the content of the work to the work speed regulation body.

6. The control apparatus of a hybrid construction machine according to claim 4, further comprising:

a work mode switch with which the content of work can be selected by an operator, and a switch detection body for detecting the content of the work selected with the work mode switch and outputting the content of the work to the work speed regulation body.

7. The control apparatus of a hybrid construction machine according to claim 1, wherein the hybrid construction machine is a hybrid excavator.

8. The control apparatus of a hybrid construction machine according to 4, wherein the construction machine is a hybrid excavator.

* * * * *

UNITED STATES PATENT AND TRADEMARK OFFICE
CERTIFICATE OF CORRECTION

PATENT NO.       : 7,279,801 B2                                          Page 1 of 1
APPLICATION NO.  : 10/893262
DATED            : October 9, 2007
INVENTOR(S)      : Kagoshima It is certified that error appears in the above-identified patent and that said Letters Patent is hereby corrected as shown below:

On the title page, Item (30), the Foreign Application Priority Data has been omitted. Item (30) should read:

-- (30)        Foreign Application Priority Data

Jun. 25, 1999     (JP)     ………………..     11-179681
       Jun. 25, 1999     (JP)     ………………..     11-179682
       Jun. 25, 1999     (JP)     ………………..     11-179683 --

Signed and Sealed this

Eighteenth Day of December, 2007

JON W. DUDAS
*Director of the United States Patent and Trademark Office*